K. I. LINDSTRÖM.
MILKING MACHINE.
APPLICATION FILED AUG. 5, 1909.

941,789. Patented Nov. 30, 1909.

UNITED STATES PATENT OFFICE.

KNUT IVAR LINDSTRÖM, OF NYKVARN, SWEDEN.

MILKING-MACHINE.

941,789.   Specification of Letters Patent.   Patented Nov. 30, 1909.

Application filed August 5, 1909.   Serial No. 511,303.

*To all whom it may concern:*

Be it known that I, KNUT IVAR LINDSTRÖM, residing at Nykvarn, Sweden, a subject of the King of Sweden, have invented certain new and useful Improvements in Milking-Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention relates to an improvement in such milking machines as work with two or several plungers which by means of a liquid or gaseous driving medium are brought to press against the teat successively from the top downward and thereby press the milk out of the same.

In order that the greatest possible effect may be attained by the machine, it is desirable that the uppermost plunger in each milking organ acting upon a teat acts upon the teat and presses it together in such a way that the greatest possible quantity of milk will be shut up in the teat in order to be successively squeezed out by a plunger or plungers situated below. By means of the present invention this will be attained thereby that the uppermost plunger is provided with at least two pressure pads, an upper one arranged upon a rod actuated upon by a spiral spring and movable in the plunger and a lower one fixedly arranged upon the plunger. The upper pressure pad projects beyond the lower one for the purpose of acting first upon and pressing together the teat on the forward motion of the plunger, whereupon, according as the spiral spring is pressed together, the lower pressure pad is pushed forward and concentrates the milk downward.

On the annexed drawing a milking organ is shown in an embodiment according to this invention.

Figure 1:
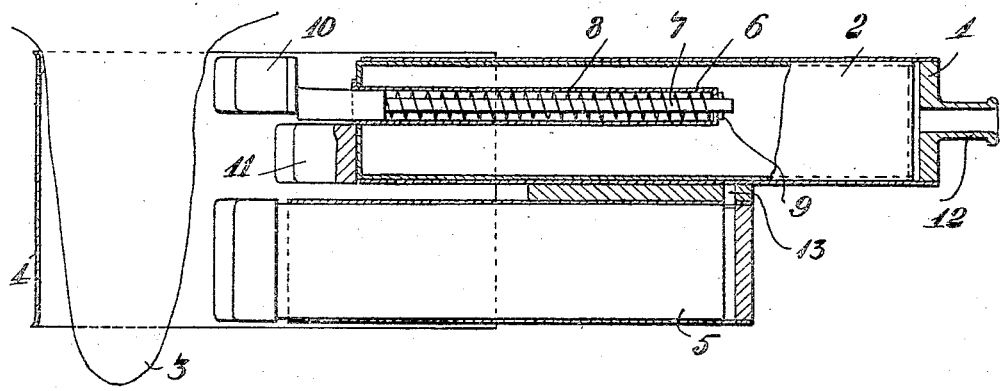
Figure 2:
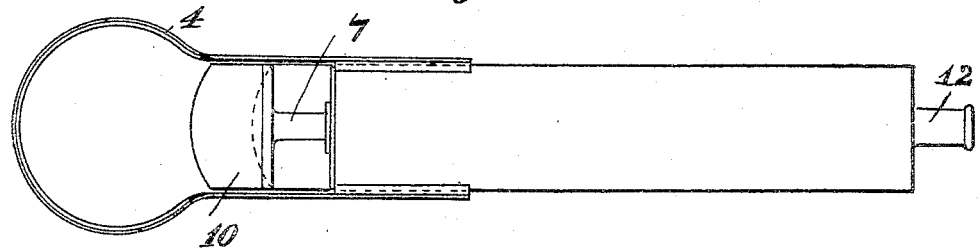

The same is shown in Figure 1 in longitudinal section, and in Fig. 2 seen from above.

The organ is composed of two plungers 2, 5, which are movable in their cylinders —1— and which press the teat —3— successively from the top downward against the abutment —4— which is connected with the cylinders —1— in a suitable manner. A pipe shaped shell —6—, in which the rod —7— guided by the said shell is movable, is arranged in that end of the upper plunger which is turned toward the teat, and the rod is pressed forward by the spiral spring —8— as far as the pin —9— will allow. The pressure pad —10— of caoutchouc or of any other soft and elastic material is attached to the rod —7— and the pressure pad —11— of the same material to the plunger —2—.

In the embodiment shown, the milking organ is arranged in accordance with the Swedish Patent No. 22780, *i. e.* in the wall between the cylinders —1— a channel —13— is arranged which allows the passage of the pressure medium to the lower cylinder at the working position of the plunger —2—.

The device works in the following way: When the pressure medium, in this case press-air, is let in through the nozzle —12— into the cylinder —1—, the plunger —2— is forced against the teat, whereby this one at first is pressed together against the abutment —4— by the pressure pad —10—, by which the connection of the teat with the udder is cut off. In the same degree the spiral spring —8— is then pressed together, the pressure pad 11 is pushed forward and concentrates the milk, inclosed in the teat, downward, after which the plunger —5—, when the channel —13— has been opened, is pushed forward in its turn and presses the milk out of the teat. The above described arrangement of the pressure pad of the uppermost plunger may be used even in the event of this plunger acting upon a shell (not shown here) inclosing the cylinder —1—, in which case the pressure pad —10— with its rod and pipe-shaped shell as well as the pressure pad —11— is arranged on the shell.

It is evidently not necessary to use a spiral spring —8— as intermedium between the plunger —2— and the pad —10—, but the same may be replaced by another elastic medium, for example caoutchouc, air or the like.

Claims.

1. In milking machines, a teat receiver, a duplex plunger casing, a hollow plunger adapted to be actuated by pressure, a secondary plunger adapted to be driven by power received from the casing of the plunger first mentioned after said plunger has been impelled forward, in combination with a pad on the end of one plunger and two pads on the end of the other plunger and means for introducing pressure into said duplex casing.

2. In milking machines, a plunger casing and teat receiver, in combination with a plunger driven by pressure, a pad, a rod on which said pad is mounted, a spring fitting around said rod, a casing in said plunger for said spring and another pad arranged underneath and a little behind the first mentioned pad.

3. In milking machines, a teat receiver and a duplex plunger casing, in combination with two pressure actuated plungers arranged one above the other, the upper one being slightly in advance of the lower one, a pad on the end of the lower plunger, a fixed pad on the end of the upper plunger, a spring held pad mounted in the upper plunger above and a little in advance of said fixed pad, and means for introducing pressure into said duplex casing to actuate the plungers.

4. In milking machines, in combination, a cylindrical teat receiver, a duplex plunger casing, two pressure actuated plungers provided with pads said pads being so mounted on said plungers that they will engage in succession from top to bottom with the teat, said pads being so formed that the part which engages the teat corresponds in form to the part of the interior of the teat receiver against which the pads operate.

In testimony that I claim the foregoing as my invention, I have signed my name in presence of two subscribing witnesses.

KNUT IVAR LINDSTRÖM.

Witnesses:
GUSTAF ALSON,
TORVALD NYSTRÖM.